United States Patent
Deshpande et al.

(10) Patent No.: US 9,150,462 B2
(45) Date of Patent: Oct. 6, 2015

(54) HEATED INFLATION SYSTEM

(71) Applicant: Goodrich Corporation, Charlotte, NC (US)

(72) Inventors: Jayant V. Deshpande, Chandler, AZ (US); Tony Pope, Tempe, AZ (US); Jagadish Thammanna, Bangalore (IN); Petchi Subramanian, Bangalore (IN); Guruprasad Srikanta Prasad, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 109 days.

(21) Appl. No.: 13/957,946

(22) Filed: Aug. 2, 2013

(65) Prior Publication Data

US 2015/0033974 A1 Feb. 5, 2015

(51) Int. Cl.
*B64D 25/14* (2006.01)
*C06D 5/00* (2006.01)

(52) U.S. Cl.
CPC . *C06D 5/00* (2013.01); *B64D 25/14* (2013.01)

(58) Field of Classification Search
CPC .... Y10S 244/905; B64D 25/14; B64D 45/00; B64C 25/56; B60R 21/26; B60R 2021/2607
USPC ................. 102/530; 244/905, 137.2; 280/741, 280/728.1
See application file for complete search history.

(56) References Cited

U.S. PATENT DOCUMENTS

| | | | |
|---|---|---|---|
| 4,026,580 A * | 5/1977 | Wulf et al. | 280/736 |
| 4,978,832 A | 12/1990 | Rubin | |
| 5,088,516 A | 2/1992 | Fisher | |
| 5,197,595 A | 3/1993 | Coultas | |
| 5,257,640 A * | 11/1993 | Delajoud | 137/14 |
| 5,578,008 A | 11/1996 | Hara | |
| 5,655,790 A * | 8/1997 | Faigle et al. | 280/737 |
| 5,931,342 A | 8/1999 | Taylor | |
| 6,025,576 A | 2/2000 | Beck et al. | |
| 6,877,698 B2 | 4/2005 | Baker et al. | |
| 7,015,425 B2 | 3/2006 | Neal et al. | |
| 7,490,795 B2 | 2/2009 | Clegg et al. | |
| 2002/0140217 A1 | 10/2002 | Wynsberghe et al. | |
| 2004/0000617 A1 | 1/2004 | Baker et al. | |
| 2004/0195457 A1 | 10/2004 | Baker et al. | |
| 2006/0085919 A1 | 4/2006 | Kramer et al. | |
| 2007/0045473 A1 * | 3/2007 | Clegg et al. | 244/137.2 |

FOREIGN PATENT DOCUMENTS

EP 1433702 A1 6/2004
EP 1818258 8/2007

OTHER PUBLICATIONS

"Evacuation slide," Wikipedia, downloaded from http://en.wikipedia.org/wiki/Evacuation_slide on Mar. 13, 2013, 7 pages.
European Patent Application No. 14178058.5, Extended European Search Report dated Jan. 7, 2015, 6 pages.
U.S. Appl. No. 14/461,989, Non-Final Office Action dated Jul. 9, 2015, 29 pages.

* cited by examiner

*Primary Examiner* — Joshua Freeman
(74) *Attorney, Agent, or Firm* — Cantor Colburn LLP

(57) ABSTRACT

A heated inflation system for an inflatable device on an aircraft is provided. The heated inflation system includes an inflation cylinder configured to hold a gas mixture under pressure, a heating element configured to selectively heat the gas mixture, and a temperature sensor configured to sense a temperature of the gas mixture. The heated inflation system also includes a control module coupled to the heating element and the temperature sensor. The control module is configured to regulate heat applied by the heating element to the gas mixture based on a sensed temperature from the temperature sensor.

13 Claims, 3 Drawing Sheets

HEATED INFLATION SYSTEM

BACKGROUND OF THE INVENTION

The subject matter disclosed herein relates to inflatable evacuation systems. More specifically, the subject disclosure relates to a heated inflation system.

A conventional inflation system for an aircraft evacuation slide includes a compressed gas cylinder with a few mechanical parts to regulate and direct gas flow to a slide system. The compressed gas cylinder, also referred to as an inflation cylinder, is sized based on evacuation slide performance requirements at an extreme cold temperature, e.g., −65 degrees F. (−53.88 degrees C.). The compressed gas cylinder is typically sized to provide a portion of the volume needed to inflate the aircraft evacuation slide, with the remaining volume supplied by ambient air pulled into the aircraft evacuation slide through an aspirator. The size and weight of the compressed gas cylinder is a significant contributor to the overall weight, volume and pack density of a packed slide system.

BRIEF DESCRIPTION OF THE INVENTION

According to one aspect, a heated inflation system for an inflatable device on an aircraft is provided. The heated inflation system includes an inflation cylinder configured to hold a gas mixture under pressure, a heating element configured to selectively heat the gas mixture, and a temperature sensor configured to sense a temperature of the gas mixture. The heated inflation system also includes a control module coupled to the heating element and the temperature sensor. The control module is configured to regulate heat applied by the heating element to the gas mixture based on a sensed temperature from the temperature sensor.

According to another aspect, a method of controlling a heated inflation system for an inflatable device on an aircraft is provided. The method includes sensing, by a temperature sensor coupled to a control module of the heated inflation system, a temperature of a gas mixture in an inflation cylinder of the heated inflation system as a sensed temperature. The method also includes comparing, by the control module, the sensed temperature to a set point value. The control module turns on a heating element based on determining that the sensed temperature is below the set point value, where the heating element is configured to selectively heat the gas mixture. The control module turns off the heating element based on determining that the sensed temperature is above the set point value.

DETAILED DESCRIPTION OF THE INVENTION

Exemplary embodiments provide a heated inflation system for an inflatable device, such as a slide, raft, or slide/raft combination for use on an aircraft. As an aircraft can operate in a wide range of temperature environments, inflatable evacuation systems must also be operable over a wide range of temperatures. In an inflatable evacuation system that relies upon an inflation cylinder, pressure within the inflation cylinder may decrease at lower temperatures which can reduce the rate of inflation of the inflatable device. Heating gas within the inflation cylinder and maintaining temperature around a set point value that is close to a typical ambient temperature can reduce the overall volume of gas needed to be stored within the inflation cylinder to accommodate low temperature conditions (e.g., −65 degrees F. (−53.88 degrees C.)), and thus reduce size and weight associated with the inflation cylinder. Accordingly, embodiments provide a heated inflation system for an inflation cylinder in an aerospace environment.

Figure 1:
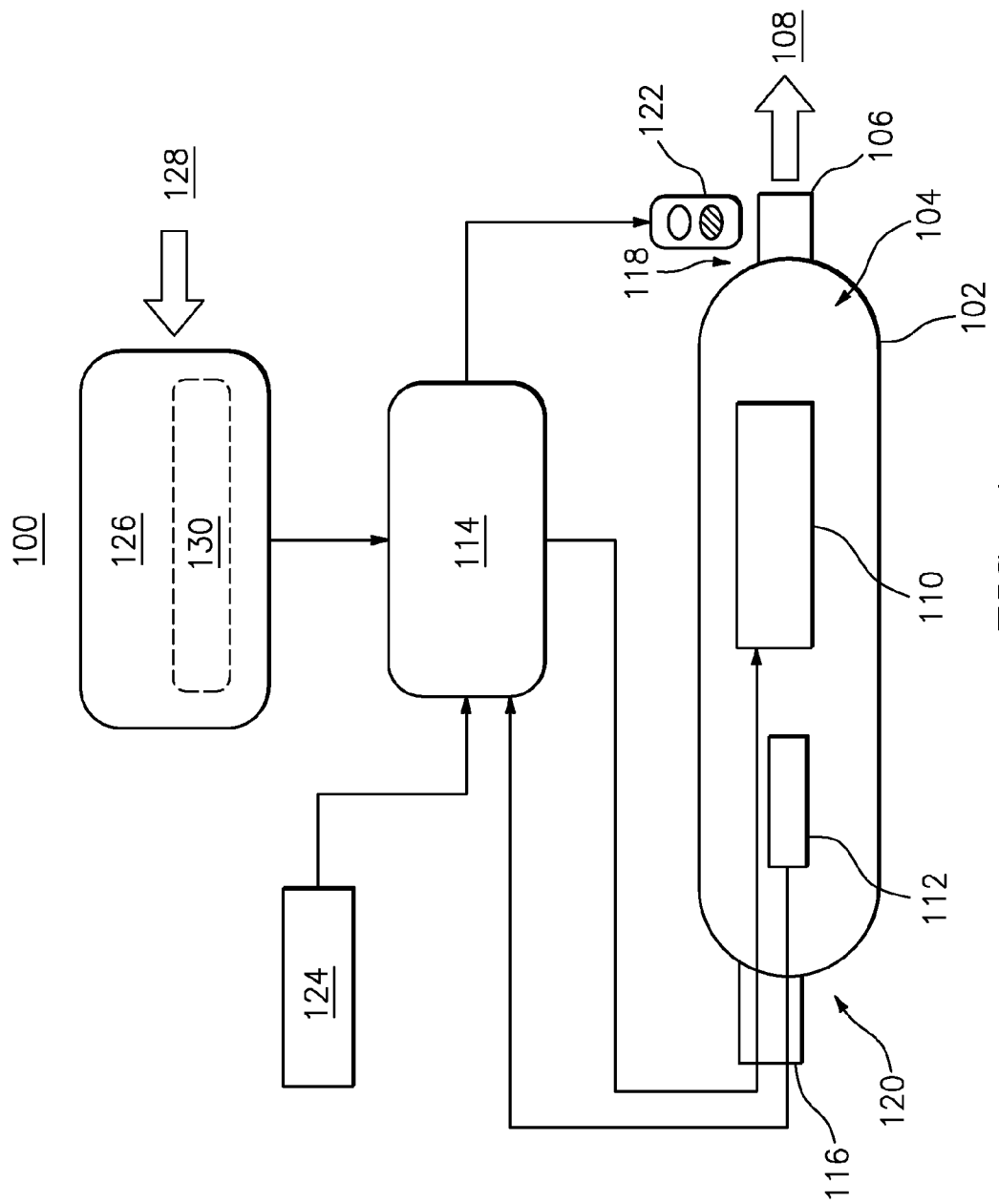
FIG. 1 is a block diagram of a heated inflation system according to an embodiment.

FIG. 1 depicts an example block diagram of a heated inflation system 100 according to an embodiment. The heated inflation system 100 includes an inflation cylinder 102 configured to hold a gas mixture 104 that is under pressure. The gas mixture 104 can be a combination of carbon dioxide and nitrogen gas blended at a ratio specific to requirements associated with an intended installation environment of the heated inflation system 100. Similarly, the inflation cylinder 102 is sized according to requirements associated with an intended installation environment of the heated inflation system 100. The inflation cylinder 102 includes a regulator assembly 106 configurable to maintain a release pressure of the gas mixture 104 as it exits the inflation cylinder 102 to inflate an inflatable device 108. Additional components (not depicted) can be disposed between the regulator assembly 106 and the inflatable device 108, such as tubing, an aspirator, and other elements known in the art. The inflatable device 108 can be, for example, a slide, raft, or slide/raft combination. The heated inflation system 100 and the inflatable device 108 can be installed in a packed slide system of an aircraft (not depicted).

A heating element 110 and a temperature sensor 112 may be disposed within the inflation cylinder 102 to selectively heat the gas mixture 104 and sense a temperature of the gas mixture 104. The heating element 110 can be implemented as one or more flexible heaters, such as polyimide heaters, silicone rubber heaters, heating tape, or mica heaters. Alternatively, the heating element 110 can be implemented as an insertion heater, an immersion heater, a cartridge heater, or other heater type known in the art. A control module 114 is configured to regulate heat applied by the heating element 110 to the gas mixture 104 based on a sensed temperature from the temperature sensor 112.

The heating element 110 and temperature sensor 112 can be coupled to the control module 114 through a port 116 in the inflation cylinder 102. In the example of FIG. 1, the port 116 is separately located from the regulator assembly 106. The regulator assembly 106 may be located at a first end 118 of the inflation cylinder 102, while the port 116 is located at a second end 120 of the inflation cylinder 102 opposite the first end 118. Wiring the heating element 110 and temperature sensor 112 through the port 116 rather than through the regulator assembly 106 may enable use of an existing regulator assembly 106 without redesign to support internal heating of the inflation cylinder 102 and avoids obstruction of gas flow out the inflation cylinder 102.

The control module 114 can also control a visual indicator 122 to provide a health status of the heated inflation system 100. The visual indicator 122 may illuminate a green light when no fault is detected and a red light when a fault is detected. The visual indicator 122 may be located in close proximity to the inflation cylinder 102 or at a remote location, such as within an aircraft cockpit and/or a flight attendant panel (FAP).

The control module 114 may also be responsive to a reset input 124 which can reinitialize the control module 114. The reset input 124 can be provided by a button, switch, or remote command from an aircraft bus (not depicted).

A power module 126 receives and conditions input power 128 to power the control module 114. The input power 128 may be provided from an aircraft power bus or battery system (not depicted). The power module 126 can also include a battery backup 130 in case of loss of input power 128.

Figure 2:
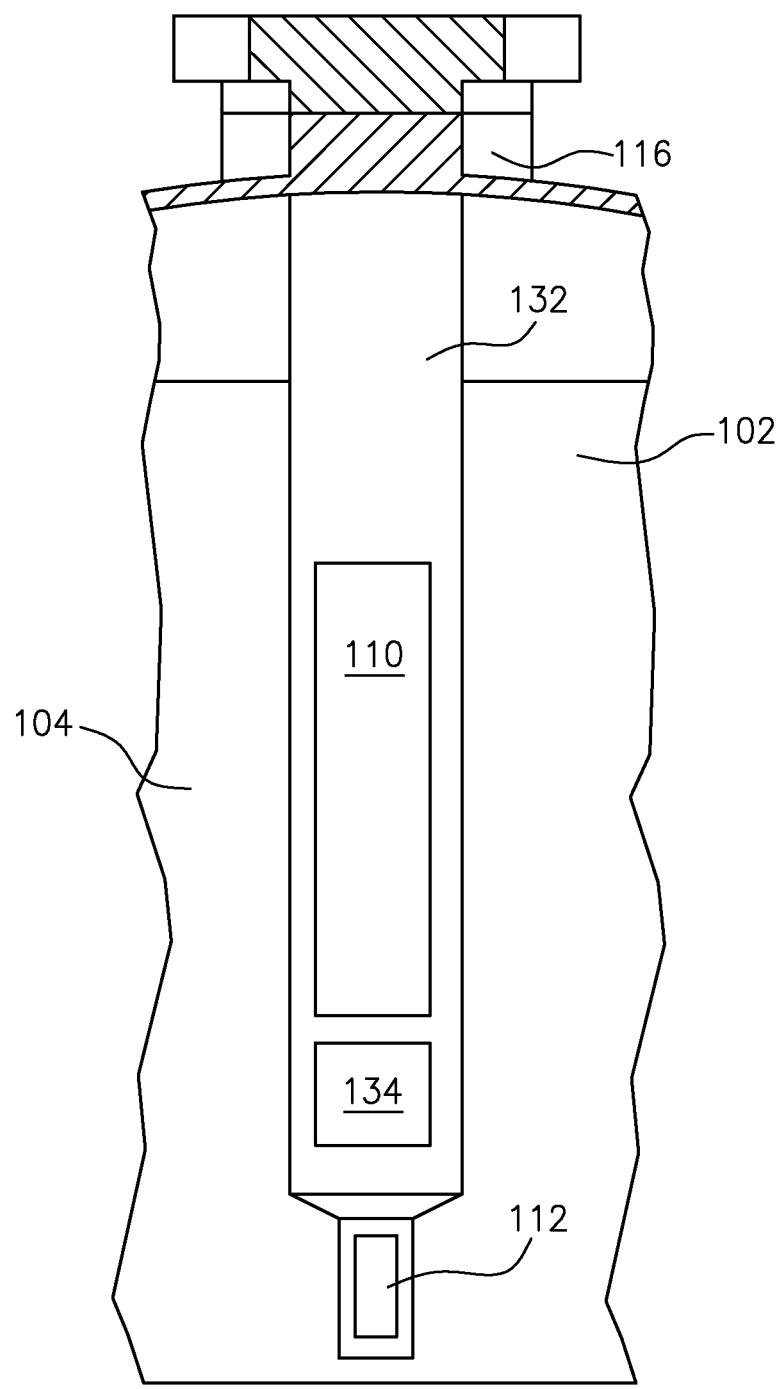
FIG. 2 is a view of a heating element assembly according to an embodiment.

FIG. 2 depicts a heating element assembly 132 within the inflation cylinder 102 of FIG. 1 according to an embodiment. The heating element assembly 132 is installed in the port 116 of the inflation cylinder 102. The heating element assembly 132 may provide a metallic housing for the heating element 110 and the temperature sensor 112. The heating element assembly 132 can be sized and positioned such that heat produced by the heating element 110 is substantially centrally concentrated within the inflation cylinder 102. Insulation material 134 may be installed within the heating element assembly 132 between the heating element 110 and the temperature sensor 112 such that the temperature sensor 112 can more accurately sense the temperature of the gas mixture 104 rather than the temperature of the heating element 110. The heating element assembly 132 is designed to withstand internal temperature and pressure variations of the inflation cylinder 102 while preventing leakage and reaction to the gas mixture 104.

Figure 3:
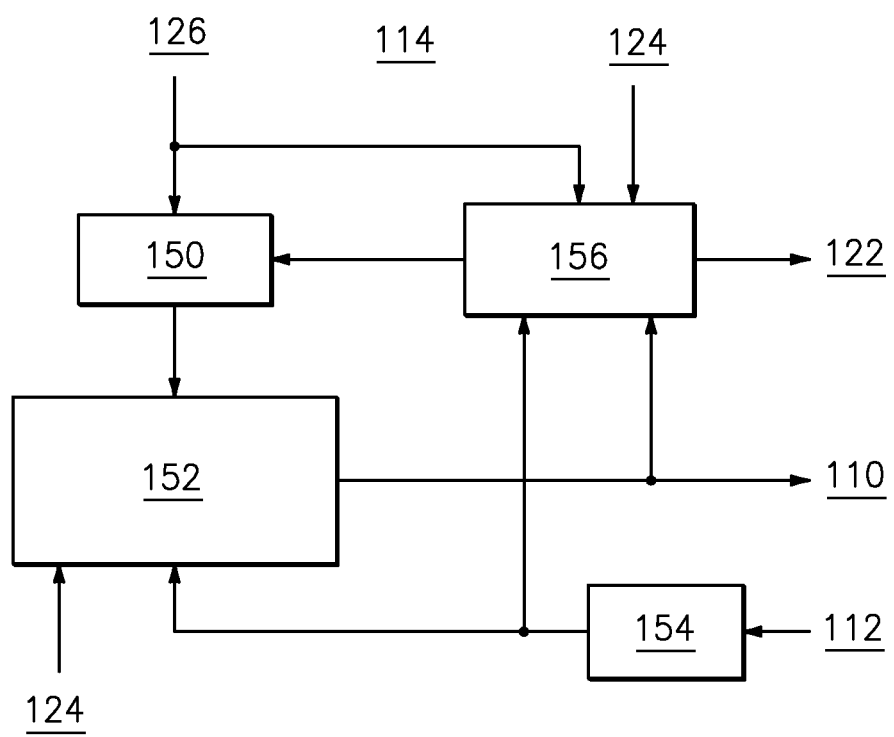
FIG. 3 is a block diagram of a control module of a heated inflation system according to an embodiment.

FIG. 3 is a block diagram of the control module 114 of the heated inflation system 100 of FIG. 1 according to an embodiment. The control module 114 can be implemented using a combination of hardware and software. Software may be embodied in a tangible non-transitory computer storage medium, such as non-volatile memory, that configures one or more processing circuits to execute a sequence of instructions. The control module 114 can include one or more application specific circuits, field programmable circuits, and/or programmable logic devices configured to perform the processes as described herein.

In the example of FIG. 3, the control module 114 includes a power controller 150, a heating element controller 152, a temperature sensor interface 154, and a health monitor 156. The power controller 150 is configured to receive power from the power module 126 and provide power to the heating element controller 152. The power controller 150 may also provide local lower voltage power rails to run electronics within the control module 114. The power controller 150 may receive information from the power module 126 or be able to determine a source of the input power 128 and whether power is provided by the battery backup 130 of FIG. 1. For example, there may be separate physical inputs that provide power from an aircraft bus, ground power, and/or battery power, and the power controller 150 can determine which input or inputs are active. Depending upon which power source is active, different monitoring thresholds can be applied to determine health of the heated inflation system 100 of FIG. 1. Additionally, the heating element controller 152 may use a lower temperature set point value for activating the heating element 110 if operating in a reduced power mode, e.g., the battery backup 130 of FIG. 1 is active.

The temperature sensor interface 154 receives a sensed temperature from the temperature sensor 112 and provides the sensed temperature to the heating element controller 152 and the health monitor 156. The temperature sensor interface 154 may apply an engineering unit conversion to the sensed temperature to convert, for example, analog-to-digital converter counts into a temperature value in degrees C. or degrees F. The heating element controller 152 compares the sensed temperature from the temperature sensor interface 154 and determines whether the temperature of the gas mixture 104 of FIG. 1 is above or below a set point value. If the sensed temperature is below the set point value, the heating element controller 152 commands the heating element 110 to turn on, allowing power from the power controller 150 to pass through to the heating element 110. If the sensed temperature is above the set point value, the heating element controller 152 commands the heating element 110 to turn off, preventing power from the power controller 150 to pass through to the heating element 110. There may be a threshold band of hysteresis values applied to the set point value to prevent on/off cycling. For instance if the set point is 77 degrees F. (25 degrees C.), a +/−10 degree band may be applied. The heating element controller 152 may also receive the reset input 124, and in response thereto, reinitialize itself to a set of initial conditions, e.g., reload set point and hysteresis values and clear temporary variables.

The health monitor 156 may monitor a number of inputs to determine if a fault condition exists. For example, the health monitor 156 can monitor voltage and/or current from the power module 126, an output of the heating element controller 152 to the heating element 110, and the sensed temperature from the temperature sensor 112 as conditioned by the temperature sensor interface 154. The health monitor 156 may also initiate built-in tests to check the health of monitored elements. When a fault condition is detected by the health monitor 156, such as a power fault, a heating element fault, or a temperature sensor fault, the health monitor 156 can output a fault indication on the visual indicator 122, e.g., activate a red light. A power fault may be a low power condition where insufficient power is available to drive the heating element 110. A heating element fault may be a heating element 110 open or heating element 110 shorted condition including any part of the wiring/interface between the control module 114 and the heating element 110. A temperature sensor fault may be a temperature sensor 112 open or temperature sensor 112 shorted condition including any part of the wiring/interface between the control module 114 and the temperature sensor 112.

The health monitor 156 can also be configured to detect if the heating element 110 enters an uncontrolled heating mode, such as reaching a maximum safe operating temperature. As one example, the maximum safe operating temperature may be about 150 degrees F. (65.56 degrees C.). Upon reaching the maximum safe operating temperature, the health monitor 156 may command the power controller 150 to disconnect power and thereby turn off the heating element 110. Reaching the maximum safe operating temperature may also be indicated as a fault on the visual indicator 122. Similar to the heating element controller 152, the health monitor 156 may also receive the reset input 124, and in response thereto, reinitialize itself to a set of initial conditions, e.g., reload monitoring parameters, clear temporary variables, and initiate built-in tests. When the control module 114 is operational and all built-in tests have successfully completed, the health monitor 156 may output a green light on the visual indicator 122 to indicate a system ready/operable condition.

Although only individual instances of the power controller 150, heating element controller 152, temperature sensor interface 154, and health monitor 156 are depicted in FIG. 3, it will be understood that multiple instances of one or more of the power controller 150, heating element controller 152, temperature sensor interface 154, and health monitor 156 can be implemented for redundancy, such as a duplex or triplex system. Additionally, the power controller 150, heating element controller 152, temperature sensor interface 154, and health monitor 156 can be combined or further subdivided within the scope of various embodiments.

A method of using the control module 114 to control the heated inflation system 100 of FIG. 1 includes sensing, by the temperature sensor 112 coupled to the control module 114 of the heated inflation system 100, a temperature of the gas mixture 104 in the inflation cylinder 102 of the heated inflation system 100 as a sensed temperature. The control module 114 compares the sensed temperature to a set point value and may apply a hysteresis band to the set point value when comparing the sensed temperature to the set point value. The control module 114 turns on the heating element 110 based on determining that the sensed temperature is below the set point value, and the control module 114 turns off the heating element 110 based on determining that the sensed temperature is above the set point value. The control module 114 can receive power from the power module 126 and determine whether the power is provided by the battery backup 130. The power controller 150 of the control module 114 can provide power to the heating element controller 152 of the control module 114 for the heating element 110. The temperature sensor interface 154 can provide the sensed temperature from the temperature sensor 112 to the heating element controller 152. The health monitor 156 of the control module 114 can determine whether a fault indication is detected. The health monitor 156 controls the visual indicator 122 based on the fault indication. The health monitor 156 may control the visual indicator 122 based on one or more of: a power fault, a heating element fault, over pressurizing and a temperature sensor fault.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A heated inflation system for an inflatable device on an aircraft, comprising:
    an inflation cylinder that holds a gas mixture under pressure;
    a heating element that selectively heats the gas mixture;
    a temperature sensor configured to that senses a temperature of the gas mixture, wherein the heating element and the temperature sensor are internally disposed within the inflation cylinder; and
    a control module coupled to the heating element and the temperature sensor, the control module regulates heat applied by the heating element to the gas mixture based on a sensed temperature from the temperature sensor, wherein the heating element and the temperature sensor are coupled to the control module through a port of the inflation cylinder, and the inflation cylinder further comprises a regulator assembly at a first end of the inflation cylinder and the port is located at a second end of the inflation cylinder.

2. The heated inflation system of claim 1, wherein the heating element and the temperature sensor are internally disposed within a heating element assembly installed in the port.

3. A heated inflation system for an inflatable device on an aircraft, comprising:
    an inflation cylinder that holds a gas mixture under pressure;
    a heating element that selectively heats the gas mixture;
    a temperature sensor that senses a temperature of the gas mixture, wherein the heating element and the temperature sensor are internally disposed within a heating element assembly installed in a port of the inflation cylinder, and insulation material is installed within the heating element assembly between the heating element and the temperature sensor; and
    a control module coupled to the heating element and the temperature sensor, wherein the control module regulates heat applied by the heating element to the gas mixture based on a sensed temperature from the temperature sensor, and the heating element and the temperature sensor are coupled to the control module through the port of the inflation cylinder.

4. The heated inflation system of claim 1, further comprising a visual indicator coupled to the control module, wherein the control module determines a fault indication of the heated inflation system and controls the visual indicator based on the fault indication.

5. The heated inflation system of claim 1, further comprising a power module that provides power to the control module from one of: input power and a battery backup.

6. The heated inflation system of claim 1, wherein the control module further comprises a heating element controller that turns the heating element on and off based on comparison of the sensed temperature to a set point value including a hysteresis band.

7. The heated inflation system of claim 6, wherein the control module further comprises a power controller that provides power to the heating element controller for the heating element, a temperature sensor interface that receives the sensed temperature from the temperature sensor and provides the sensed temperature to the heating element controller, and a health monitor that controls a visual indicator based on one or more of: a power fault, a heating element fault, and a temperature sensor fault.

8. A method of controlling a heated inflation system for an inflatable device on an aircraft, comprising:
    sensing, by a temperature sensor coupled to a control module of the heated inflation system, a temperature of a gas mixture in an inflation cylinder of the heated inflation system as a sensed temperature;
    comparing, by the control module, the sensed temperature to a set point value;
    turning on, by the control module, a heating element based on determining that the sensed temperature is below the set point value, wherein the heating element selectively heats the gas mixture;
    turning off, by the control module, the heating element based on determining that the sensed temperature is above the set point value;
    determining, by the control module, whether a fault indication is detected; and
    controlling a visual indicator by the control module based on the fault indication;
    wherein the heating element and the temperature sensor are internally disposed within the inflation cylinder and are coupled to the control module through a port of the inflation cylinder and wherein the inflation cylinder further comprises a regulator assembly at a first end of the inflation cylinder and the port is located at a second end of the inflation cylinder.

9. The method of claim 8, wherein the heating element and the temperature sensor are internally disposed within a heating element assembly installed in the port.

10. The method of claim 9, wherein insulation material is installed within the heating element assembly between the heating element and the temperature sensor.

11. The method of claim 8, further comprising:
   receiving power at the control module from a power module; and
   determining, by the control module, whether the power is provided by a battery backup.

12. The method of claim 8, further comprising applying a hysteresis band to the set point value when comparing the sensed temperature to the set point value.

13. The method of claim 8, further comprising:
   providing power to a heating element controller of the control module for the heating element;
   providing the sensed temperature to the heating element controller; and
   controlling the visual indicator by a health monitor of the control module based on one or more of: a power fault, a heating element fault, and a temperature sensor fault.

* * * * *